United States Patent
Ozcan

(10) Patent No.: US 9,143,875 B2
(45) Date of Patent: Sep. 22, 2015

(54) DETERMINATION OF AMBIENT SOUND PROCESSED AUDIO INFORMATION

(71) Applicant: Nokia Corporation, Espoo (FI)

(72) Inventor: Koray Ozcan, Farnborough (GB)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/021,815

(22) Filed: Sep. 9, 2013

(65) Prior Publication Data

US 2015/0071449 A1    Mar. 12, 2015

(51) Int. Cl.

| | |
|---|---|
| *H04M 1/00* | (2006.01) |
| *H04M 9/00* | (2006.01) |
| *H04M 11/00* | (2006.01) |
| *H04R 29/00* | (2006.01) |
| *H04M 1/60* | (2006.01) |
| *H04M 1/725* | (2006.01) |
| *G10L 21/0208* | (2013.01) |

(52) U.S. Cl.
CPC ............ *H04R 29/00* (2013.01); *G10L 21/0208* (2013.01); *H04M 1/605* (2013.01); *H04M 1/6008* (2013.01); *H04M 1/72569* (2013.01); *H04M 1/72583* (2013.01); *H04M 2250/12* (2013.01)

(58) Field of Classification Search
CPC ............ G10L 21/0208; G10K 11/178; G10K 11/1784; G10K 11/1788; G10K 2210/1081; H04B 3/23; H04M 2201/40; H04M 1/82; H04M 1/271; H04M 1/573; H04M 1/6008; H04M 19/02; H04M 19/04; H04M 3/42; H04M 3/42153; H04M 3/42204; H04M 3/42323; H04M 3/436; H04M 3/493; H04M 3/4931; H04M 3/533; H04M 3/537; H04M 3/56; H04M 3/565; H04M 3/567; H04M 3/568; H04M 7/0057; H04M 9/08; H04M 9/082; H04M 2250/12; H04M 1/605; H04M 1/72569; H04M 1/72583; H04Q 1/4465; H04Q 1/457; H04Q 1/46; H04Q 3/0029; H04R 1/1083; H04R 29/00
USPC ............ 379/88.01, 201.01, 202.01, 351, 372, 379/388.01, 388.02, 388.04, 406.01, 379/406.02, 406.03; 381/56, 57, 71.1, 94.1; 455/570

See application file for complete search history.

(56) References Cited

U.S. PATENT DOCUMENTS

| | | | | |
|---|---|---|---|---|
| 8,320,974 | B2* | 11/2012 | Nicholson | 455/570 |
| 8,600,454 | B2* | 12/2013 | Nicholson | 455/570 |
| 8,600,743 | B2* | 12/2013 | Lindahl et al. | 704/233 |
| 2007/0154049 | A1* | 7/2007 | Levitsky et al. | 381/371 |
| 2008/0086301 | A1* | 4/2008 | Tachibana | 704/201 |
| 2010/0016014 | A1* | 1/2010 | White | 455/556.1 |
| 2010/0080084 | A1* | 4/2010 | Chen et al. | 367/118 |
| 2010/0081487 | A1 | 4/2010 | Chen et al. | |
| 2010/0131749 | A1* | 5/2010 | Kim et al. | 713/100 |
| 2010/0311465 | A1* | 12/2010 | Lai | 455/556.2 |
| 2011/0166856 | A1* | 7/2011 | Lindahl et al. | 704/233 |
| 2012/0058803 | A1* | 3/2012 | Nicholson | 455/570 |

(Continued)

*Primary Examiner* — Khai N Nguyen
(74) *Attorney, Agent, or Firm* — McClure and Associates, PLLC

(57) ABSTRACT

A method comprising receiving an indication of an input indicative of the user not facing the apparatus, determining an ambient sound non-limitation directive associated with the audio uplink based, at least in part, on the input, receiving other audio information, determining ambient sound non-limited audio information based, at least in part, on the other audio information, and causing transmission of the ambient sound non-limited audio information by way of the audio uplink is disclosed.

20 Claims, 9 Drawing Sheets

(56) References Cited

U.S. PATENT DOCUMENTS

| | | | |
|---|---|---|---|
| 2012/0172094 A1* | 7/2012 | Lin et al. | 455/570 |
| 2012/0281856 A1* | 11/2012 | Georgiou et al. | 381/94.2 |
| 2013/0065652 A1* | 3/2013 | Nicholson | 455/570 |
| 2013/0243213 A1* | 9/2013 | Moquin | 381/71.1 |
| 2013/0260834 A1* | 10/2013 | Ingalls | 455/566 |
| 2013/0301850 A1* | 11/2013 | Usher et al. | 381/74 |
| 2014/0079235 A1* | 3/2014 | Lyons | 381/71.6 |

\* cited by examiner

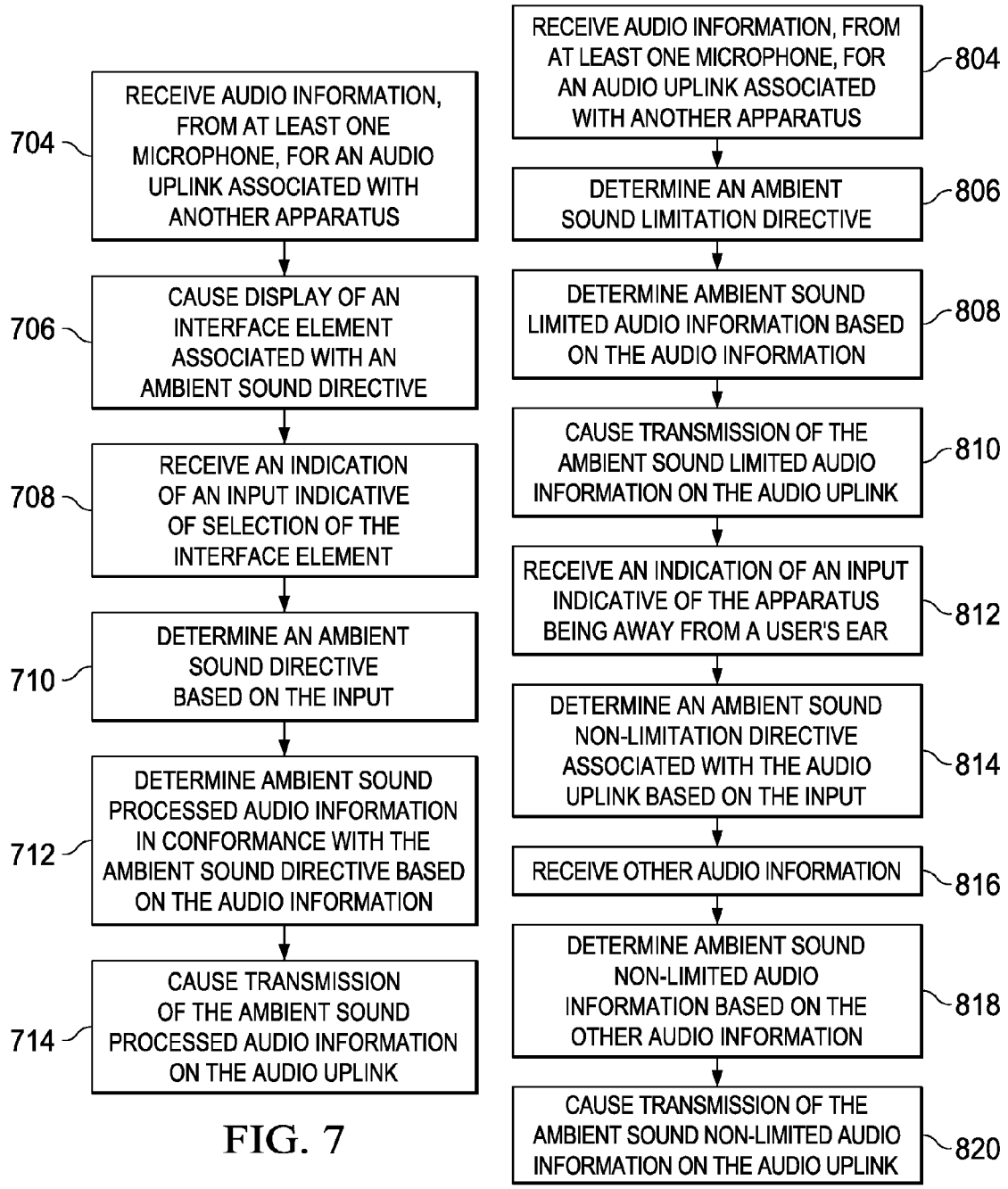

DETERMINATION OF AMBIENT SOUND PROCESSED AUDIO INFORMATION

TECHNICAL FIELD

The present application relates generally to determination of ambient sound processed audio information.

BACKGROUND

Many users have become dependent on electronic apparatuses to manage various aspects of their lives. For example, users have become accustomed to keeping at least one electronic apparatus with them for many different purposes, such as communication, finding information, navigation, rendering media, and/or the like. As users have become more reliant on electronic apparatuses for communication, the manner in which users communicate with each other using their electronic apparatuses has evolved. It may be desirable to provide a way for users to communicated better and easier with each other that allows for the types of communication that users desire.

SUMMARY

Various aspects of examples of the invention are set out in the claims.

One or more embodiments may provide an apparatus, a computer readable medium, a non-transitory computer readable medium, a computer program product, and a method for receiving audio information, from at least one microphone, for an audio uplink associated with another apparatus, determining an ambient sound directive associated with the audio uplink, the ambient sound directive being determined from a set of possible ambient sound directives that comprises at least an ambient sound limitation directive and an ambient sound non-limitation directive, determining ambient sound processed audio information in conformance with the ambient sound directive based, at least in part, on the audio information, and causing transmission of the ambient sound processed audio information by way of the audio uplink.

One or more embodiments may provide an apparatus, a computer readable medium, a computer program product, and a non-transitory computer readable medium having means for receiving audio information, from at least one microphone, for an audio uplink associated with another apparatus, means for determining an ambient sound directive associated with the audio uplink, the ambient sound directive being determined from a set of possible ambient sound directives that comprises at least an ambient sound limitation directive and an ambient sound non-limitation directive, means for determining ambient sound processed audio information in conformance with the ambient sound directive based, at least in part, on the audio information, and means for causing transmission of the ambient sound processed audio information by way of the audio uplink.

In at least one example embodiment, the ambient sound limitation directive relates to causation of reduction of ambient sound.

In at least one example embodiment, the ambient sound limitation directive relates to utilization of one or more speech enhancement techniques.

In at least one example embodiment, the ambient sound directive relates to the ambient sound limitation directive and the ambient sound processed audio information is ambient sound limited audio information.

In at least one example embodiment, determining the ambient sound limited audio information comprises utilization of one or more ambient sound reduction techniques.

In at least one example embodiment, the audio information relates to audio information associated with a plurality of microphones, and the ambient sound reduction technique relates to determination of directional audio information.

In at least one example embodiment, the directional audio information is determined based, at least in part, on a unitary audio source presumption.

In at least one example embodiment, the determination of the ambient sound limited audio information comprises ambient sound cancelation.

In at least one example embodiment, the audio information relates to audio information associated with at least one speech microphone and audio information associated with at least one ambient microphone, and the determination of the ambient sound limited audio information comprises cancelling at least part of the audio information associated with a speech microphone based, at least in part, on the audio information associated with the ambient microphone.

In at least one example embodiment, determining the ambient sound limited audio information comprises disabling one or more ambient microphones.

In at least one example embodiment, the ambient sound non-limitation directive relates to absence of reduction of ambient sound.

In at least one example embodiment, the ambient sound non-limitation directive relates to preclusion of one or more speech enhancement techniques.

In at least one example embodiment, the ambient sound directive relates to the ambient sound non-limitation directive and the ambient sound processed audio information is ambient sound non-limited audio information.

In at least one example embodiment, determining the ambient sound non-limited audio information comprises preclusion of one or more ambient sound reduction techniques.

In at least one example embodiment, the audio information relates to audio information associated with a plurality of microphones, and the ambient sound non-limited audio information relates to omnidirectional audio information.

In at least one example embodiment, the omnidirectional audio information is determined based, at least in part, on a presumption of a plurality of audio sources.

In at least one example embodiment, the determination of the ambient sound non-limited audio information comprises ambient sound inclusion.

In at least one example embodiment, the audio information relates to audio information associated with at least one speech microphone and audio information associated with at least one ambient microphone, and the determination of the ambient sound non-limited audio information comprises including at least part of the audio information associated with a speech microphone and, at least part of, the audio information associated with the ambient microphone.

In at least one example embodiment, determining the ambient sound non-limited audio information comprises enabling one or more ambient microphones.

In at least one example embodiment, the audio uplink relates to a voice call.

In at least one example embodiment, the determination to send the audio information to the other apparatus is based, at least in part, on origination of the voice call from the apparatus.

In at least one example embodiment, the determination to send the audio information to the other apparatus is based, at least in part, on receiving an indication of origination of the voice call by the other apparatus.

In at least one example embodiment, determination of the ambient sound directive is based, at least in part, on a predetermined setting.

In at least one example embodiment, the predetermined setting relates to a default setting.

In at least one example embodiment, the predetermined setting relates to a user configurable setting.

One or more example embodiments further perform receiving an indication of an input indicative of the ambient sound directive, wherein determination of the ambient sound directive is based, at least in part, on the input.

In at least one example embodiment, the input is indicative of the apparatus being proximate to a user's ear, and the ambient sound directive relates to an ambient sound limitation directive.

In at least one example embodiment, the input is indicative of the apparatus becoming positioned proximate to a user's ear, and the ambient sound directive relates to an ambient sound limitation directive.

In at least one example embodiment, the input is indicative of the apparatus being away from a user's ear, and the ambient sound directive relates to an ambient sound non-limitation directive.

In at least one example embodiment, the input is indicative of the apparatus becoming positioned away from a user's ear, and the ambient sound directive relates to an ambient sound non-limitation directive.

One or more example embodiments further perform causing display of an interface element associated with the ambient sound directive, wherein the input relates to the interface element.

In at least one example embodiment, the interface element is indicative of the ambient sound directive.

In at least one example embodiment, the input is indicative of selection of the interface element, and the ambient sound directive relates to an ambient sound limitation directive.

In at least one example embodiment, the input is indicative of selection of the interface element, and the ambient sound directive relates to an ambient sound non-limitation directive.

In at least one example embodiment, the interface element is caused to be displayed while the audio uplink is active.

In at least one example embodiment, the input is indicative of the user facing the apparatus, and the ambient sound directive relates to an ambient sound limitation directive.

In at least one example embodiment, the input is indicative of the apparatus becoming oriented to face the user, and the ambient sound directive relates to an ambient sound limitation directive.

In at least one example embodiment, the input is indicative of the user not facing the apparatus, and the ambient sound directive relates to an ambient sound non-limitation directive.

In at least one example embodiment, the input is indicative of the apparatus becoming oriented to not face the user, and the ambient sound directive relates to an ambient sound non-limitation directive.

In at least one example embodiment, the ambient sound directive relates to an ambient sound limitation directive, the ambient sound processed audio information is ambient sound limited audio information, and further performing receiving an indication of an input indicative of the apparatus being away from a user's ear, determining an ambient sound non-limitation directive associated with the audio uplink based, at least in part, on the input, receiving other audio information, determining ambient sound non-limited audio information based, at least in part, on the other audio information, and causing transmission of the ambient sound non-limited audio information by way of the audio uplink.

In at least one example embodiment, the ambient sound directive relates to an ambient sound limitation directive, the ambient sound processed audio information is ambient sound limited audio information, and further performing receiving an indication of an input indicative of the user not facing the apparatus determining an ambient sound non-limitation directive associated with the audio uplink based, at least in part, on the input receiving other audio information, determining ambient sound non-limited audio information based, at least in part, on the other audio information, and causing transmission of the ambient sound non-limited audio information by way of the audio uplink.

In at least one example embodiment, the ambient sound directive relates to an ambient sound limitation directive, the ambient sound processed audio information is ambient sound limited audio information, and further performing causing display of an interface element associated with the ambient sound directive, receiving an indication of an input indicative of selection of the interface element, determining an ambient sound non-limitation directive associated with the audio uplink based, at least in part, on the input, receiving other audio information, determining ambient sound non-limited audio information based, at least in part, on the other audio information, and causing transmission of the ambient sound non-limited audio information by way of the audio uplink.

In at least one example embodiment, the ambient sound directive relates to a directive that specifies a magnitude of ambient audio information.

In at least one example embodiment, the magnitude of ambient audio information relates to scaling factor that indicates the magnitude as a proportion of ambient sound processed audio to allocate to the ambient audio information.

In at least one example embodiment, the ambient sound directive relates to a directive that specifies a magnitude of speech audio information.

In at least one example embodiment, the magnitude of speech audio information relates to scaling factor that indicates the magnitude as a proportion of ambient sound processed audio to allocate to the speech audio information.

In at least one example embodiment, the ambient sound directive relates to a directive that specifies a magnitude of ambient audio information in relation to speech audio information.

In at least one example embodiment, the magnitude of ambient audio information in relation to speech audio information relates to a scaling factor that indicates the magnitude as a proportion of ambient sound processed audio to allocate to the speech audio information and ambient sound information.

In at least one example embodiment, the scaling factor relates to a percentage.

In at least one example embodiment, determination of ambient sound processed audio information in conformance with the ambient sound directive that specifies the magnitude comprises determination of the ambient sound processed audio information in conformance with the magnitude.

In at least one example embodiment, determination of the ambient sound processed audio information in conformance with the magnitude relates to determination of the ambient sound processed audio information such that the ambient sound processed audio information comprises at least one of: ambient sound information in proportion to the magnitude, or speech sound information in proportion to the magnitude.

One or more example embodiments further perform receiving an indication of an input indicative of the magnitude.

One or more example embodiments further perform causing display of a slider interface element associated with the ambient sound directive, wherein the input indicative of the magnitude relates to an input indicative of a position on the slider interface element.

In at least one example embodiment, the slider interface element comprises a slider endpoint associated with speech audio information and a slider endpoint associated with ambient audio information, and the magnitude of ambient audio information in relation to speech audio information relates to a scaling factor that indicates the magnitude as a proportion of ambient sound processed audio to allocate to the speech audio information and ambient sound information, such that the position on the slider interface element indicates the proportion.

In at least one example embodiment, the position on the slider interface element indicates the proportion such that the proportion relates to a factor indicative of a distance from the position to at least one slider endpoint.

In at least one example embodiment, an ambient sound limitation directive relates to an ambient sound directive that specifies a magnitude of ambient sound information indicative of a reduction of ambient sound information.

In at least one example embodiment, an ambient sound non-limitation directive relates to an ambient sound directive that specifies a magnitude of ambient sound information non-indicative of a reduction of ambient sound information.

In at least one example embodiment, the magnitude of ambient sound information non-indicative of a reduction of ambient sound information relates to at least one of: a magnitude of ambient sound information that corresponds with a received ambient sound information, or a magnitude of ambient sound information that corresponds with an increase of ambient sound information.

BRIEF DESCRIPTION OF THE DRAWINGS

For a more complete understanding of embodiments of the invention, reference is now made to the following descriptions taken in connection with the accompanying drawings in which:

FIG. 7 is a flow diagram illustrating determination of ambient sound processed audio information according to at least one example embodiment;

FIG. 8 is a flow diagram illustrating determination of ambient sound processed audio information according to at least one example embodiment;

DETAILED DESCRIPTION OF THE DRAWINGS

Figure 1:
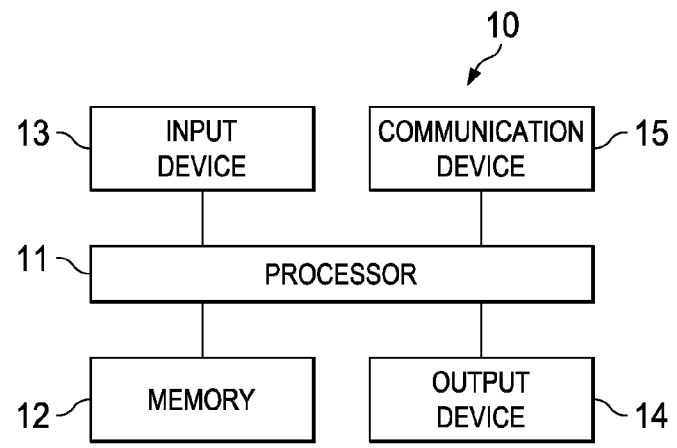
FIG. 1 is a block diagram showing an apparatus according to an example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. Any keys may be physical keys in which, for example, an electrical connection is physically made or broken, or may be virtual. Virtual keys may be, for example, graphical representations on a touch sensitive surface, whereby the key is actuated by performing a hover or touch gesture on or near the surface. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
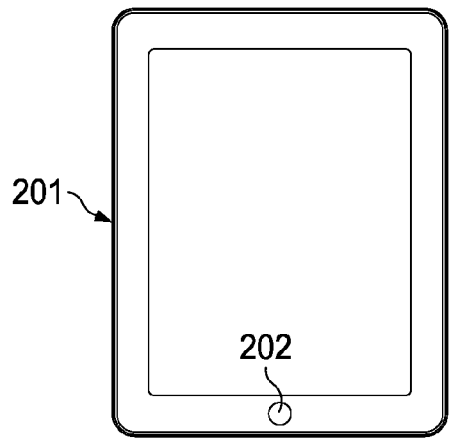
FIGS. 2A-2C are diagrams illustrating at least one microphone of an apparatus according to at least one example embodiment.
Figure 2B:
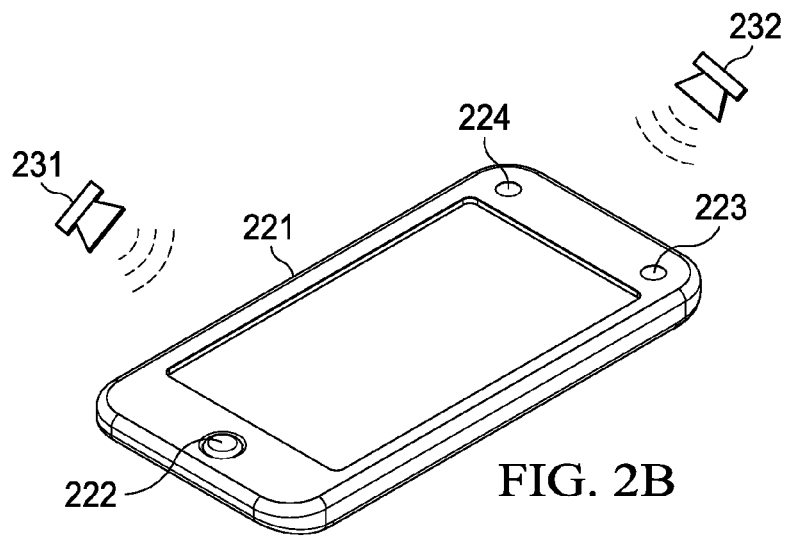
Figure 2C:
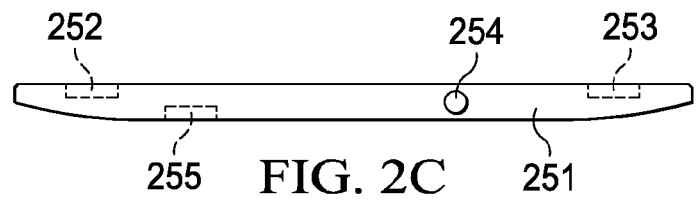

FIGS. 2A-2C are diagrams illustrating at least one microphone of an apparatus according to at least one example embodiment. The examples of FIGS. 2A-2C are merely examples of at least one microphone of an apparatus, and do not limit the scope of the claims. For example, number of microphones may vary, placement of microphones may vary, housing of the apparatus may vary, and/or the like.

As electronic apparatuses have become more prolific, users have become increasingly reliant on using electronic apparatuses for communication. For example, users rely on electronic apparatuses, such as mobile phones, tablet computers, laptop computers, desktop computers, and/or the like, for communicating with each other. The manner of communication that users may utilize may vary. For example, an apparatus may communicate by way of a message, an information transfer, a voice call, a video call, and/or the like. For example, the apparatus may establish an uplink to another apparatus for sending audio information, video information, and/or the like, to the other apparatus. The uplink may be associated with cellular communication protocols, as previously described, voice over internet protocol (VOIP), and/or the like. In at least one example embodiment, a voice call relates to the apparatus sending audio information by way of an audio uplink, to another apparatus. It should be understood that the audio information may be transmitted by way of the audio uplink directly to the other apparatus, by way of an intermediary apparatus, and/or the like. It should be understood that there are many protocols and delivery mechanisms available to an apparatus, and that many other protocols and delivery mechanisms will become available in the future, and that such protocols and delivery mechanisms do not limit the claims in any way.

The uplink audio may instead relate to a message that is to be sent outside of a voice call. For example, it may refer to audio that is being or has been recorded to create a recorded voice or other recorded audio message that is to be delivered to a recipient over a data network such as the internet, a wide area network, and/or a local area network. For example, the message may be uploaded to a server from where it can be downloaded by the recipient.

In at least one example embodiment, an apparatus determines to send audio information to another apparatus by way of an audio uplink. In at least one example embodiment, the audio uplink may be associated with a video uplink, for example in association with a video call. In at least one example embodiment, the apparatus receives audio information, for example from at least one microphone, for the audio uplink. For example, the apparatus may determine to acquire audio information for the purpose of sending the audio information to another apparatus by way of an audio uplink.

In at least one example embodiment, determination to send the audio information by way of an audio uplink may relate to instantiation of a communication associated with audio transmission. For example, the determination to send the audio information to the other apparatus may be based, at least in part, on origination of the voice call. In at least one example embodiment, origination relates to an apparatus invoking operations associated with establishing a call, such as sending information indicative of establishing a phone call, establishing a voice communication session, establishing a video communications session, and/or the like. In at least one example embodiment, the determination to send the audio information to the other apparatus may be based, at least in part, on origination of the voice call from the apparatus. The apparatus may determine to originate the voice call based, at least in part, on user input indicative of origination of the voice call, such as input associated with a call button. In at least one example embodiment, the determination to send the audio information to the other apparatus is based, at least in part, on receiving an indication of origination of the voice call by the other apparatus. For example, the apparatus may receive a request to receive a call, to join a session associated with a call, and/or the like.

In at least one example embodiment, the apparatus causes transmission of audio information by way of the audio uplink. In at least one example embodiment, transmission of the audio information relates to sending the audio information by way of a medium and/or protocol that allows the other apparatus to receive, at least part of, the audio information. The apparatus may cause transmission of the audio information by transmitting the audio information, by sending the audio information to a different apparatus, which transmits the audio information, and/or the like.

The audio information may be any information that represents audio. For example the audio information may relate to a compressed audio format, such as any of the moving picture expert group (MPEG) formats, an uncompressed audio format, such as pulse code modulated (PCM) information, and/or the like. It should be understood that there are many audio formats available to an apparatus, and that many other audio formats will become available in the future, and that such audio formats do not limit the claims in any way. The apparatus may receive the audio information from one or more microphones. It should be understood that there are many types of microphones available to an apparatus, and that many other types of microphones will become available in the future, and that such types of microphones do not limit the claims in any way. The apparatus may comprise the microphone, may receive the audio information from the microphone by way of another apparatus, and/or the like.

FIG. 2A is a diagram illustrating microphone 202 of apparatus 201 according to at least one example embodiment. It can be seen that microphone 202 is positioned on apparatus 202 such that the microphone may receive audio information proximate to the mouth of a user when speaking into apparatus 201. The positioning may be such that microphone 202 is proximate to the mouth of the user when the user holds apparatus 201 similar to the example of FIG. 3A. In at least one example embodiment, apparatus 201 receives audio information from microphone 202.

Voice activity detection (VAD) is a mandatory requirement in many communication standards. In such circumstances, voice activity detection is used with a suitable noise suppression algorithm to reduce ambient noise during times when voice activity is not detected. Even apparatuses with a single microphone may be capable of evaluating voice and/or ambient sound. The term "Ambient sound" is used to describe "background noise". In many circumstances, estimation of ambient sound may be desirable in many apparatuses. The basic idea of estimating the ambient sound may be to analyze input signal frames during periods associated with lack of speech activity. For example, it may be determined whether a current frame contains speech and/or ambient sound. In such an example, the output of the VAD may be desirable. In at least one example embodiment, based on the VAD information, ambient sound may be suppressed for quality and intelligibility of speech signal. In some apparatuses with multi-microphone configurations it may be desirable to provide an advanced level of noise suppression or directionality. For example, it may be desirable that uplink audio emphasizes speech by reducing ambient sound.

In some circumstances, it may be desirable to process audio information regarding ambient sound. In at least one example embodiment, the apparatus processes audio information to determine ambient sound processed audio information. For example, audio information may be determined such that ambient sound is limited, such that ambient sound supplements other audio information, such that ambient sound is preserved, and/or the like. In at least one example embodiment, ambient sound relates to audio information that is not attributable to a user speaking. For example, a user may be speaking into a microphone of the apparatus. The sound attributable to the user speech may be considered to be non-ambient sound. In such an example, there may be other sound being received by the microphone, such as background sounds, music, and/or the like. In at least one example embodiment, the apparatus receives audio information comprising speech and ambient sound. The apparatus may determine ambient sound processed audio information based, at least in part, on the audio information. For example, the apparatus may determine the processed audio information by way of modification of the audio information, combining audio information associated with different microphones, restricting audio information associated with different microphone, eliminating audio information associated with different microphones, and/or the like. Such information may depend also upon the use case (e.g. whether the apparatus is configured to be placed close the user's mouth when making a so-called 'handset call', or is configured to be placed further away from the user's mouth in order to make a so-called 'speakerphone call' or 'handsfree speaker call'. In some embodiments microphones comprised by the device may co-operate with one or more microphones that are part of other apparatuses, for example a microphone forming part of a peripheral apparatus such as a headset, speakerphone, or an audio system of a vehicle.

In at least one example embodiment, ambient sound processed audio information relates to ambient sound limited audio information. In at least one example embodiment, the ambient sound limited audio information relates to audio information indicative of a reduced ambient sound component. For example, ambient sound limited audio information may relate to ambient sound processed audio information indicative of audio information that has been subject to a limitation of ambient sound. For example, determining the ambient sound limited audio information may comprise utilization of one or more ambient sound reduction techniques. In another example, determining the ambient sound limited audio information may comprise utilization of one or more speech enhancement techniques. In at least one example embodiment, ambient sound limited audio information relates to audio information in which ambient sound may be limited and non-ambient sound may be retained.

In at least one example embodiment, ambient sound processed audio information relates to ambient sound non-limited audio information. In at least one example embodiment, the ambient sound non-limited audio information relates to audio information indicative of an included ambient sound component. For example, ambient sound non-limited audio information may relate to ambient sound processed audio information indicative of audio information that has not been subject to a limitation of ambient sound, has been subject to an enhancement of ambient sound, and/or the like. For example, determining the ambient sound non-limited audio information may comprise preclusion of one or more ambient sound reduction techniques. In another example, determining the ambient sound non-limited audio information may comprise preclusion of one or more speech enhancement techniques.

In at least one example embodiment, a speech enhancement technique relates to one or more operations associated with processing audio information in a manner that favors inclusion of speech sounds over inclusion of ambient sounds. The speech enhancement technique may comprise at least one filtration technique, at least one restoration technique, at least one speech model technique, and/or the like. In at least one example embodiment, a filtration technique relates to a technique associated with removal of audio information indicative of ambient sound, such as spectral subtraction, Weiner filtering, signal subspace approach (SSA) filtering, and/or the like. In at least one example embodiment, spectral restoration relates to enhancement of audio information indicative of speech, such as minimum mean square error short time spectral amplitude estimator (MMSE-STSA) restoration, or any similar technique. In at least one example embodiment, a speech model technique relates to identification of audio information associated with predetermined sounds that are indicative of speech.

In at least one example embodiment, the audio information relates to audio information associated with a plurality of microphones. One or more of the microphones may be comprised by the apparatus. One or more microphones may be separate from the apparatus, such as a separate apparatus that provides the apparatus with audio information.

In at least one example embodiment, the ambient sound reduction technique relates to determination of directional audio information. For example, ambient sound limited audio information may be directional audio information. In at least one example embodiment, directional audio information relates to audio information relating to sound waves approaching the apparatus from a specified direction. The apparatus may determine directional audio information based, at least in part, on correlation between audio information associated with a plurality of microphones at different positions on the apparatus. For example, the apparatus may evaluate audio information associated with a plurality of microphones, and correlate the audio information based, at least in part, on information indicative of the position of the plurality of the microphones on the apparatus such that the audio information indicative of an audio source at a specified direction from the apparatus is favored over audio from other directions. In at least one example embodiment, determination of directional audio information relates to conversion of omnidirectional audio information to directional audio information. In at least one example embodiment, omnidirectional audio information relates to audio information that represents audio information perceived from various directions, for example from a plurality of sound sources. For example, the omnidirectional audio information may relate to audio information absent directional modification.

FIG. 2B is a diagram illustrating a plurality of microphones of an apparatus according to at least one example embodiment. In the example of FIG. 2B, apparatus 221 comprises microphones 222, 223, and 224. In the example of FIG. 2B, microphones 222, 223, and 224 are receiving audio information from sound sources 231 and 232. It can be seen that sound source 232 is closer to microphones 223 and 224 than sound source 231. It can be seen that sound source 231 is closer to microphone 222 than sound source 232. In at least one example embodiment, apparatus 221 receives audio information from microphones 222, 223, and 224, and determines directional audio information based on the audio information. For example, the apparatus may determine directional audio indicative of a direction that corresponds with audio source 231. In such an example, the apparatus may identify audio information associated with audio source 231 by way of time associated with audio information associated with microphone 222 versus time associated with audio information associated with microphone 223, versus time associated with audio information associated with microphone 224. In such an example, the directional audio information may be indicative of extraction of sound associated with the predetermined direction, limitation of sound associated with a direction that does not correspond with the predetermined direction, and/or the like.

In at least one example embodiment, the directional audio information is determined based, at least in part, on a unitary audio source presumption. For example, the directional audio information may be based on a presumption that sound that is desired to be included in the directional audio information is associated with a single direction. In this manner, the directional audio information may relate to sounds associated with a predetermined direction. In at least one example embodiment, the predetermined direction relates to a direction associated with a user speaking into the apparatus. For example, the apparatus may be configured in such a manner that direction of a user's mouth from the apparatus may be predictable. In such an example, the predetermined direction may be indicative of such a predicted direction of the user's mouth.

In some circumstances, it may be desirable to position microphones on the apparatus such that the microphones are directed away from a desired speech source. For example, if the user's mouth is likely to be directed towards a microphone, it may be desirable to have one or more microphones directed in a different direction. In at least one example embodiment, a microphone directed towards a predicted position of a user's mouth relates to a speech microphone. In at least one example embodiment, a microphone directed differently than a speech microphone relates to an ambient microphone. In this manner, the speech microphone may be positioned such that the audio information associated with the speech microphone is likely to have a greater speech component than audio information associated with an ambient microphone. Similarly, the ambient microphone may be positioned such that the audio information associated with the ambient microphone is likely to have a greater ambient component than audio information associated with a speech microphone.

The arrangement of microphones 222, 223, 224 in FIG. 2B is provided for ease of illustration. In practice, a suitable apparatus may comprise a different number of microphones, and/or microphones in different locations. For example, the apparatus may comprise a first microphone that is located towards the bottom of a front side of the device so as to be positioned close to the user's mouth when the apparatus is in use, and a second microphone positioned towards the top of a rear side of the device. In such a configuration the audio information associated with the first microphone may have a greater component of speech audio relative to ambient audio than the audio information associated with the second microphone.

In some circumstances, determining ambient sound limited audio information may relate to favoring audio information associated with one or more microphones, such as one or more speech microphones, over audio information associated with different one or more microphones, such as one or more ambient microphones. For example, a microphone may be associated with a direction and a different microphone may be associated with a different direction. For example, if the microphones are directional then they may be positioned such that the microphones are most sensitive in different directions, and whether directional or omni-directional the microphones may be located in different locations whereby they are directed differently in the sense that they are positioned at different distances from potential sound sources and/or with different obstructions between the microphones and the sound sources. In such an example, the apparatus may determine ambient sound limited audio information by excluding audio information associated with the different direction. In some examples, the apparatus may reduce audio information indicative of the audio information associated with the different direction. For example, the apparatus may cancel audio information based, at least in part, on audio information associated with one or more microphones. In at least one example embodiment, such cancelation relates to ambient sound cancellation. In at least one example embodiment, the apparatus may determine ambient sound limited audio information by way of disabling one or more ambient microphones. In at least one other example embodiment, the apparatus may determine ambient sound limited audio information by way of a suitable ambient sound suppression algorithm applied to audio information from one or more of the microphones.

In at least one example embodiment, the determination of ambient sound limited audio information comprises ambient sound cancelation. For example, the audio information relates to audio information associated with at least one speech microphone and audio information associated with at least one ambient microphone. In such an example, the determination of the ambient sound limited audio information comprises cancelling at least part of the audio information associated with a speech microphone based, at least in part, on the audio information associated with the ambient microphone. For example, cancelation may relate to inverting, at least part of, ambient audio information and combining the inverted ambient audio information with the audio information.

In at least one example embodiment, ambient sound non-limited audio information relates to audio information that includes, or that is intended to include, ambient audio information. For example, ambient sound non-limited audio information may relate to omnidirectional audio information. In at least one example embodiment, determining the ambient sound non-limited audio information comprises enabling one or more ambient microphones. For example, the determination of the ambient sound non-limited audio information may comprise including at least part of the audio information associated with a speech microphone and, at least part of, the audio information associated with the ambient microphone. In other examples, determining the ambient sound non-limited audio information does not comprise enabling one or more ambient microphones, but instead comprises including audio information associated with a speech microphone that is identified as relating to ambient sound, for example using VAD.

FIG. 2C is a diagram illustrating a plurality of microphones of an apparatus according to at least one example embodiment. In the example of FIG. 2C, apparatus 251 comprises a plurality of microphones. It can be seen that microphones 252 and 253 are at different positions on the same face of apparatus 251, that microphone 255 is on the opposite face of apparatus 251 from microphones 252 and 253, and that microphone 254 is on the side of apparatus 251. In at least one example embodiment, microphone 252 may be a speech microphone and one or more of microphones 253-255 may be ambient microphones. In some examples microphone 252 may itself be an array of closely spaced microphones arranged for beamforming towards a users mouth when the apparatus is in use.

Figure 3A:
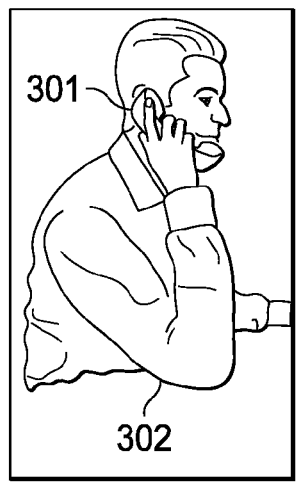
FIGS. 3A-3C are diagrams illustrating inputs indicative of an ambient sound directive according to at least one example embodiment.
Figure 3B:
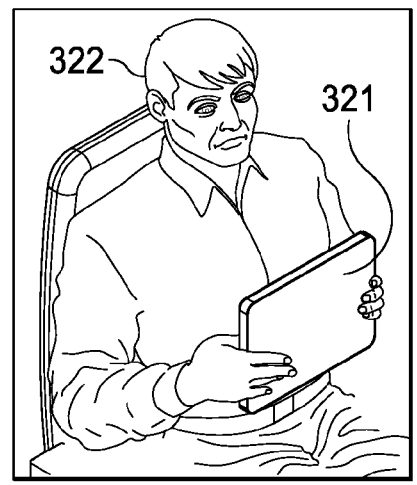
Figure 3C:
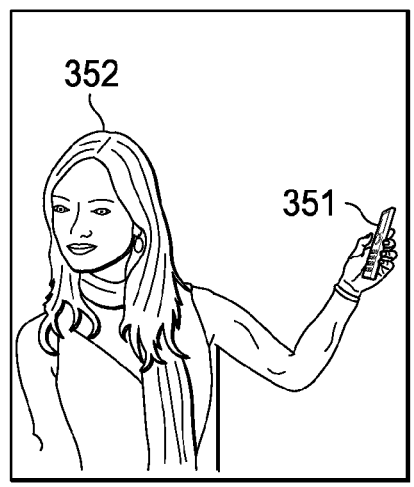

FIGS. 3A-3C are diagrams illustrating inputs indicative of an ambient sound directive according to at least one example embodiment. The examples of FIGS. 3A-3C are merely examples of inputs indicative of an ambient sound directive, and do not limit the scope of the claims. For example, inter-relation between the user and the apparatus may vary, orientation of the apparatus may vary, proximity of the user to the apparatus may vary, and/or the like.

In many circumstances, it may be desirable for the audio information of the audio uplink to be ambient sound limited audio information. For example, the purpose for the uplink audio may be for the purpose of speech communication. In such circumstances, the user of the apparatus may desire limitation of ambient sound in the audio information for the audio uplink.

As electronic apparatuses have become more prevalent, the role of communication by way of electronic apparatuses has changed. For example, users have become dependent upon electronic apparatuses for social purposes beyond mere speech communication. Although many users may rely on electronic apparatuses for speech communication, many users also rely on their apparatuses to share their experiences with their social acquaintances. For example, in some circumstances, a user may desire speech communication by way of an audio uplink, and in other circumstances, the user may desire ambient sound to be included in the audio uplink. For example, the user may desire a party receiving the uplink audio to perceive what the user is hearing, in addition to, or instead of, what the user is speaking. For example, there may be music in the background that the user desires the other party to experience. In another example, the user may desire the other party to hear how load the surrounding environment is. In such an example, the user may desire to communicate the ambiance of a party by allowing the other party to hear the ambient sound of the party.

In at least one example embodiment, the apparatus determines an ambient sound directive associated with an audio uplink. In at least one example embodiment, the ambient sound directive relates to a directive that controls whether audio information associated with the audio uplink is ambient sound limited audio information, ambient sound non-limited audio information, and/or the like. For example, there may be a set of possible ambient sound directives that the apparatus may determine. For example, there may be one or more ambient sound limitation directives associated with various manners of limiting ambient sound in the audio information of the audio uplink, there may be one or more ambient sound non-limitation directives associated various manners of including ambient sound in the audio information of the audio uplink, and/or the like. In at least one example embodiment, the set of possible ambient sound directives comprises at least one ambient sound limitation directive and at least one ambient sound non-limitation directive. In at least one example embodiment, an ambient sound limitation directive relates to causing determination of ambient sound limited audio information for an audio uplink. In at least one example embodiment, an ambient sound non-limitation directive relates to causing determination of ambient sound non-limited audio information for an audio uplink In at least one example embodiment, the apparatus determines ambient sound processed audio information in conformance with the ambient sound directive. In at least one example embodiment, conformance with the ambient sound directive relates to the apparatus determining the ambient sound processed audio information in a manner that is consistent with the ambient audio directive. For example, determination of ambient sound limited audio information may be in conformance with an ambient sound limitation directive, determination of ambient sound non-limited audio information may be in conformance with an ambient sound non-limitation directive, and/or the like.

In at least one example embodiment, the apparatus may determine an ambient sound directive based, at least in part, on an input indicative of an ambient sound directive. The input may relate to the manner in which a user is utilizing the apparatus, a selection that the user performs in relation to an interface element of the apparatus, and/or the like. The input may be a voice command that is recognized by the apparatus.

The apparatus may receive an indication of the input. In at least one example embodiment, an indication of an input relates to any information that conveys the occurrence of an input, information identifying the input, information characterizing the input, and/or the like. The apparatus may receive the indication of the input by receiving the input, by receiving information indicative of the input from another apparatus, and/or the like. In at least one example embodiment, an input indicative of an ambient sound directive relates to an input that relates the position of the user in relation to the apparatus, the orientation of the user in relation to the apparatus, and/or the like.

FIG. 3A is a diagram illustrating an input indicative of an ambient sound directive according to at least one example embodiment. In the example of FIG. 3A, the input indicative of the ambient sound directive relates to user 302 holding apparatus 301 adjacent to the user's face, for example next to the user's ear. Such position and/or orientation of the apparatus may be indicative to the user desiring speech communication. In at least one example embodiment, the apparatus receives an indication of an input indicative of the apparatus being positioned proximate to the user's ear and determines that the input is indicative of an ambient sound limitation directive. Without limiting the claims in any way, at least one technical advantage associated with determining an ambient sound limitation directive based, at least in part, on an input indicative of the apparatus being proximate to a user's ear may be to allow the user to enable ambient sound limitation by holding the apparatus in a position that is commonly used during a private conversation on an electronic apparatus. For example, the user may intuitively identify such position of the apparatus with conducting a conversation that is dedicated to speech, for at least the reason that such position is consistent with the position of holding a telephone. In at least one example embodiment, the user may move the apparatus to the position indicated by the example of FIG. 3A. In such circumstances, the apparatus may determine an ambient sound limitation directive based, at least in part, on the apparatus becoming positioned proximate to a user's ear.

The apparatus may determine an input indicative of a position and/or orientation associated with the apparatus being proximate to the ear of the user by way of a proximity sensor, a light sensor, an accelerometer, a gyroscope, touch sensor, face detection using a camera, and/or the like.

FIG. 3B is a diagram illustrating an input indicative of an ambient sound directive according to at least one example embodiment. In the example of FIG. 3B, the input indicative of the ambient sound directive relates to user 322 holding apparatus 321 such that the user is facing the apparatus, for example facing a display of the apparatus. Such position and/or orientation of the apparatus may be indicative to the user desiring speech communication. In at least one example embodiment, the apparatus receives an indication of an input indicative of the user facing the apparatus and determines that the input is indicative of an ambient sound limitation directive. Without limiting the claims in any way, at least one technical advantage associated with determining an ambient sound limitation directive based, at least in part, on an input indicative of the user facing the apparatus may be to allow the user to enable ambient sound limitation by holding the apparatus in a position that is commonly used during a conversation on an electronic apparatus. For example, the user may intuitively identify such position of the apparatus with conducting a conversation that is dedicated to speech, for at least the reason that such position is consistent with the position of facing an apparatus for a video call, viewing an apparatus for a hands-free call, and/or the like. A hands-free call may relate to the apparatus utilizing a loudspeaker instead of an earpiece speaker, or something similar. In at least one example embodiment, the user may move the apparatus to the position indicated by the example of FIG. 3B. In such circumstances, the apparatus may determine an ambient sound limitation directive based, at least in part, on the apparatus becoming oriented to face the user.

The apparatus may determine an input indicative of a position and/or orientation associated with the user facing the apparatus by way of a proximity sensor, a light sensor, an accelerometer, a gyroscope, touch sensor, face detection, face recognition, and/or the like.

FIG. 3C is a diagram illustrating an input indicative of an ambient sound directive according to at least one example embodiment. In the example of FIG. 3C, the input indicative of the ambient sound directive relates to user 352 holding apparatus 351 such that the user is orienting the apparatus in a manner that is inconsistent with pure speech communication, that is indicative of a desire to include ambient sound in the audio uplink, and/or the like. For example, the user may hold the apparatus away from himself, hold the apparatus away from the user's ear, orient the apparatus such that the user is not facing the apparatus, and/or the like. Such position and/or orientation of the apparatus may be indicative to the user desiring ambient sound communication. In at least one example embodiment, the apparatus receives an indication of an input indicative of the user not facing the apparatus, the apparatus not being proximate to the user's ear, the apparatus being held away from the user, and/or the like. In such an example, the apparatus may determine that the input is indicative of an ambient sound non-limitation directive. Without limiting the claims in any way, at least one technical advantage associated with determining an ambient sound non-limitation directive based, at least in part, on an input indicative of the user not facing the apparatus, the apparatus not being proximate to the user's ear, and/or the apparatus being held away from the user may be to allow the user to avoid ambient sound limitation by holding the apparatus in a position that is not commonly used during a conversation on an electronic apparatus, in a position that is associated with an attempt to capture ambient sound, and/or the like. For example, the user may intuitively identify such position of the apparatus with enhancing the apparatuses ability to receive ambient sound, for at least the reason that such position is consistent with capturing sounds beyond mere speech, is inconsistent with a desire to limit audio to speech, and/or the like. In at least one example embodiment, the user may move the apparatus to the position indicated by the example of FIG. 3C. In such circumstances, the apparatus may determine an ambient sound non-limitation directive based, at least in part, on the apparatus becoming held away from the user, becoming away from the user's ear, becoming oriented to not face the user, and/or the like.

The apparatus may determine an input indicative of a position and/or orientation associated with the user facing the apparatus by way of a proximity sensor, a light sensor, an accelerometer, a gyroscope, touch sensor, face detection, face recognition, and/or the like.

Figure 4A:
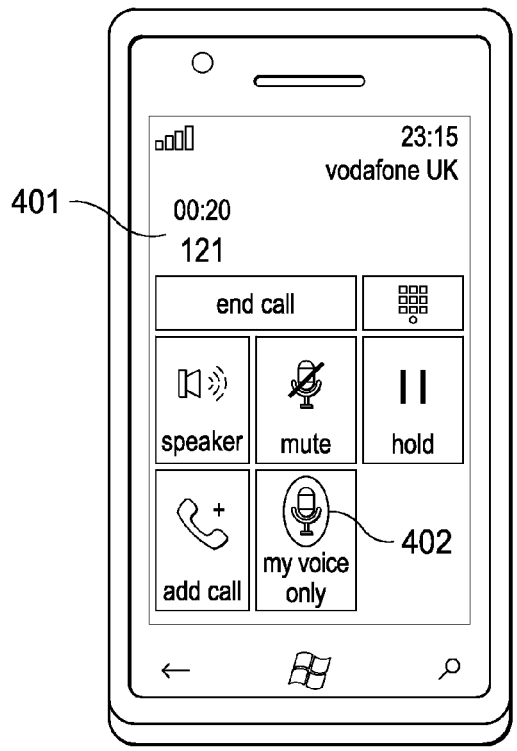
FIGS. 4A-4C are diagrams illustrating interface elements associated with an ambient sound directive according to at least one example embodiment.
Figure 4B:
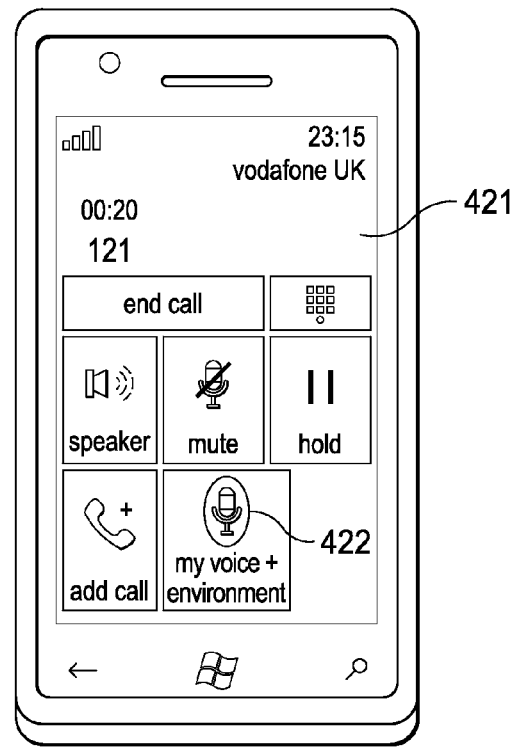
Figure 4C:
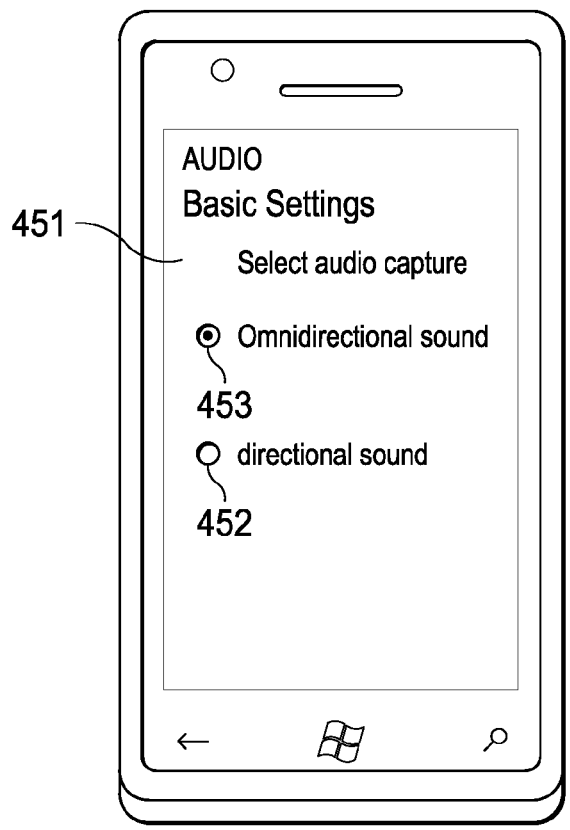

FIGS. 4A-4C are diagrams illustrating interface elements associated with an ambient sound directive according to at least one example embodiment. The examples of FIGS. 4A-4C are merely examples of interface elements associated with an ambient sound directive, and do not limit the scope of the claims. For example, representation of the interface element may vary, position of the interface element may vary, number of interface elements may vary, and/or the like.

In some circumstances, it may be desirable to allow the user to perform a selection to control whether audio information for the audio uplink comprises ambient sound limited audio information, ambient sound non-limited audio information, and/or the like. For example, the user may desire to perform an input in association with an interface element provided on a display.

In at least one example embodiment, the apparatus causes display of an interface element associated with an ambient sound directive. In at least one example embodiment, an interface element relates to a visual representation of information that is indicative of information with which a user may interact. For example, an interface element may be an icon, a button, a hyperlink, text, and/or the like. In at least one example embodiment, the interface element may be associated with an ambient sound directive by indicating the ambient sound directive, by way of being associated with invocation of the ambient sound directive, and/or the like. For example, the interface element may indicate, by way of text, image, etc., that the interface element represents a setting for an ambient sound directive.

In at least one example embodiment, causing display relates to performance of an operation that results in the interface element being displayed. For example, causing display may comprise displaying the interface element on a display, sending information indicative of the interface element to a separate apparatus so that the separate apparatus displays the interface element, and/or the like.

In at least one example embodiment, the apparatus receives an indication of an input relating to the interface element. In such an example, the determination of the ambient sound directive may be based, at least in part, on the input. For example, the input may be indicative of selection of the interface element. For example, the apparatus may determine that the input is indicative of selection of the interface element, and the apparatus may determine the ambient sound directive to relate to an ambient sound limitation directive, an ambient sound non-limitation directive, and/or the like.

FIG. 4A is a diagram illustrating interface element 402 associated with an ambient sound directive in relation to display 401 according to at least one example embodiment. It can be seen that interface element comprises an image of a microphone, although any other indication of the microphone (such as a text description) may be used instead. The image of the microphone may indicate to a user that the interface element relates to audio information received from a microphone. It can also be seen that the interface element comprises text indicating "my voice only." In at least one example embodiment, the text indication may be indicative of a currently selected ambient sound directive, an ambient sound directive that will be selected upon input associated with the interface element, and/or the like. For example, "my voice only" may indicate an ambient sound limitation directive that is currently active, that is currently selected, that will become active upon input associated with the interface element, and/or the like.

In at least one example embodiment, the interface element is caused to be displayed while the audio uplink is active. For example, the interface element may be provided in conjunction with other interface elements associated with an active audio uplink, such as a call termination interface element, a mute interface element, a volume interface element, and/or the like.

FIG. 4B is a diagram illustrating interface element 422 associated with an ambient sound directive in relation to display 421 according to at least one example embodiment. It can be seen that interface element comprises an image of a microphone. The image of the microphone may indicate to a user that the interface element relates to audio information received from a microphone. It can also be seen that the interface element comprises text indicating "my voice+environment." In at least one example embodiment, the text indication may be indicative of a currently selected ambient sound directive, an ambient sound directive that will be selected upon input associated with the interface element, and/or the like. For example, "my voice+environment" may indicate an ambient sound non-limitation directive that is currently active, that is currently selected, that will become active upon input associated with the interface element, and/or the like.

In at least one example embodiment, determination of the ambient sound directive is based, at least in part, on a predetermined setting. A predetermined setting may relate to a stored representation of an ambient sound directive that may be retrieved to allow the apparatus to determine which ambient sound directive to utilize. For example, the predetermined setting may relate to a default setting to be applied when the audio uplink is established, prior to receiving any input indicative of an ambient sound directive, and/or the like. In at least one example embodiment, the predetermined setting relates to a user configurable setting. For example, the user may be able to designate a value of the predetermined setting. The user may designate the value by way of an interface element associated with an active audio uplink, similarly as described regarding FIGS. 4A and 4B. In at least one example embodiment, the apparatus causes display of an interface element associated with an ambient sound directive while the audio uplink is inactive. In such an example, the interface element may relate to designation of a predetermined setting associated with the ambient sound directive.

FIG. 4C is a diagram illustrating interface elements 452 and 453 associated with an ambient sound directive in relation to display 451 according to at least one example embodiment. It can be seen that interface element 452 relates to "directional sound" and that interface element 453 relates to "omnidirectional sound." In at least one example embodiment, interface element 452 relates to an ambient sound limitation directive and interface element 453 relates to an ambient sound non-limitation directive. The example of FIG. 4C may relate to designation of a value for a predetermined setting associated with an ambient sound directive.

Figure 5:
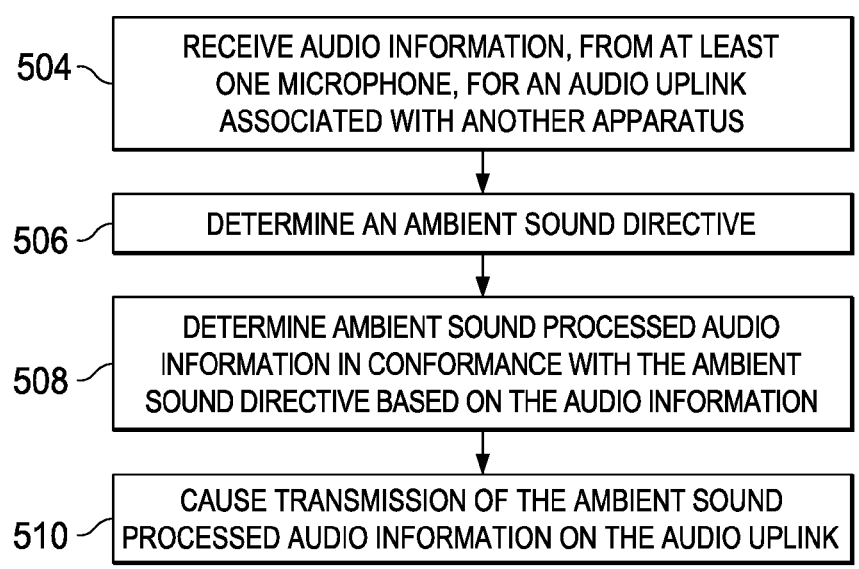
FIG. 5 is a flow diagram illustrating determination of ambient sound processed audio information according to at least one example embodiment.

FIG. 5 is a flow diagram illustrating determination of ambient sound processed audio information according to at least one example embodiment. In at least one example embodiment, there is a set of operations that corresponds the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 504, the apparatus receives audio information, from at least one microphone, for an audio uplink associated with another apparatus. The receiving, the audio uplink, the other apparatus, and the microphone may be similar as described regarding FIGS. 2A-2C. In at least one example embodiment, the apparatus determines to send audio information to another apparatus by way of an audio uplink. In such an example, the determination, the sending, the audio information, the other apparatus, and the audio uplink may be similar as described regarding FIGS. 2A-2C.

At block 506, the apparatus determines an ambient sound directive associated with the audio uplink. The determination and the ambient sound directive may be similar as described regarding FIGS. 3A-3C, FIGS. 4A-4C, and FIG. 11.

At block 508, the apparatus determines ambient sound processed audio information in conformance with the ambient sound directive based, at least in part, on the audio information. The determination, the ambient sound processed audio information, and the conformance may be similar as described regarding FIGS. 2A-2C, FIGS. 3A-3C, and FIG. 11.

At block 510, the apparatus causes transmission of the ambient sound processed audio information by way of the audio uplink. The causation and the transmission may be similar as described regarding FIGS. 2A-2C.

Figure 6:
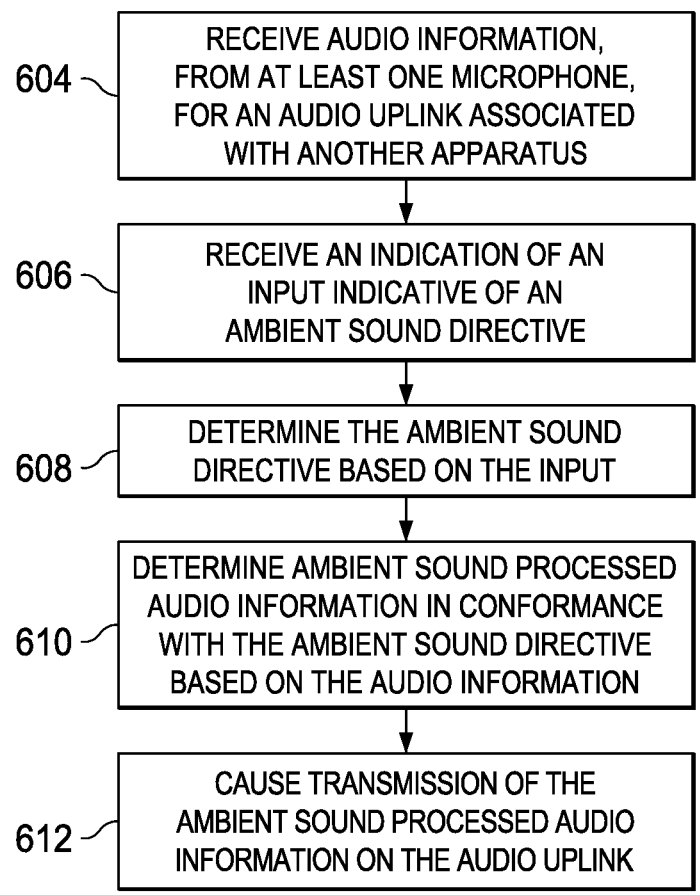
FIG. 6 is a flow diagram illustrating determination of ambient sound processed audio information according to at least one example embodiment.

FIG. 6 is a flow diagram illustrating determination of ambient sound processed audio information according to at least one example embodiment. In at least one example embodiment, there is a set of operations that corresponds the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 604, the apparatus receives audio information, from at least one microphone, for an audio uplink associated with another apparatus, similarly as described regarding block 504 of FIG. 5.

At block 606, the apparatus receives an indication of an input indicative of an ambient sound directive. The receipt, the indication, the input, and the ambient sound directive may be similar as described regarding FIGS. 3A-3C, FIGS. 4A-4C, and FIG. 11.

At block 608, the apparatus determines an ambient sound directive that is based, at least in part, on the input. The determination may be similar as described regarding FIGS. 3A-3C, and FIG. 11.

At block 610, the apparatus determines ambient sound processed audio information in conformance with the ambient sound directive based, at least in part, on the audio information, similarly as described regarding block 508 of FIG. 5. At block 612, the apparatus causes transmission of the ambient sound processed audio information by way of the audio uplink, similarly as described regarding block 510 of FIG. 5.

FIG. 7 is a flow diagram illustrating determination of ambient sound processed audio information according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 704, the apparatus receives audio information, from at least one microphone, for an audio uplink associated with another apparatus, similarly as described regarding block 504 of FIG. 5.

At block 706, the apparatus causes display of an interface element associated with the ambient sound directive. The causation of display and the interface element may be similar as described regarding FIGS. 4A-4C, and FIG. 11.

At block 708, the apparatus receives an indication of an input indicative of selection of the interface element. The indication and the input may be similar as described regarding FIGS. 4A-4C, and FIG. 11.

At block 710, the apparatus determines an ambient sound directive that is based, at least in part, on the input, similarly as described regarding block 608 of FIG. 6. At block 712, the apparatus determines ambient sound processed audio information in conformance with the ambient sound directive based, at least in part, on the audio information, similarly as described regarding block 508 of FIG. 5. At block 714, the apparatus causes transmission of the ambient sound processed audio information by way of the audio uplink, similarly as described regarding block 510 of FIG. 5.

FIG. 8 is a flow diagram illustrating determination of ambient sound processed audio information according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

In some circumstances, the apparatus may initiate an audio uplink in association with an ambient sound directive, and change the ambient sound directive while the audio uplink is active. For example, the user may desire to limit ambient audio during part of the audio uplink and may desire to include ambient audio during a different part of the uplink. In this manner, the user may be able to dynamically transition between ambient sound limited audio information and ambient sound non-limited audio information for the audio uplink. Even though the example of FIG. 8 illustrates a change from an ambient sound limitation directive to an ambient sound non-limitation directive, any combination or permutation of transitions may be possible.

At block 804, the apparatus receives audio information, from at least one microphone, for an audio uplink associated with another apparatus, similarly as described regarding block 504 of FIG. 5.

At block 806, the apparatus determines an ambient sound limitation directive associated with the audio uplink. The determination and the ambient sound limitation directive may be similar as described regarding FIGS. 3A-3C, FIGS. 4A-4C, and FIG. 11.

At block 808, the apparatus determines ambient sound limited audio information in conformance with the ambient sound limitation directive based, at least in part, on the audio information. The determination, the ambient sound limited audio information, and the conformance may be similar as described regarding FIGS. 2A-2C, FIGS. 3A-3C, and FIG. 11.

At block 810, the apparatus causes transmission of the ambient sound limited audio information by way of the audio uplink. The causation and the transmission may be similar as described regarding FIGS. 2A-2C.

At block 812, the apparatus receives an indication of an input indicative of the apparatus being away from a user's ear. The receipt, the indication, and the input may be similar as described regarding FIGS. 3A-3C and FIG. 11.

At block 814, the apparatus determines an ambient sound non-limitation directive associated with the audio uplink based, at least in part, on the input. The determination and the ambient sound non-limitation directive may be similar as described regarding FIGS. 3A-3C and FIG. 11.

At block 816, the apparatus receives other audio information, from at least one microphone, for the audio uplink. The receiving and the microphone may be similar as described regarding FIGS. 2A-2C.

At block 818, the apparatus determines ambient sound non-limited audio information in conformance with the ambient sound non-limitation directive based, at least in part, on the audio information. The determination, the ambient sound non-limited audio information, and the conformance may be similar as described regarding FIGS. 2A-2C, FIGS. 3A-3C, and FIG. 11.

At block 820, the apparatus causes transmission of the ambient sound non-limited audio information by way of the audio uplink. The causation and the transmission may be similar as described regarding FIGS. 2A-2C.

Figure 9:
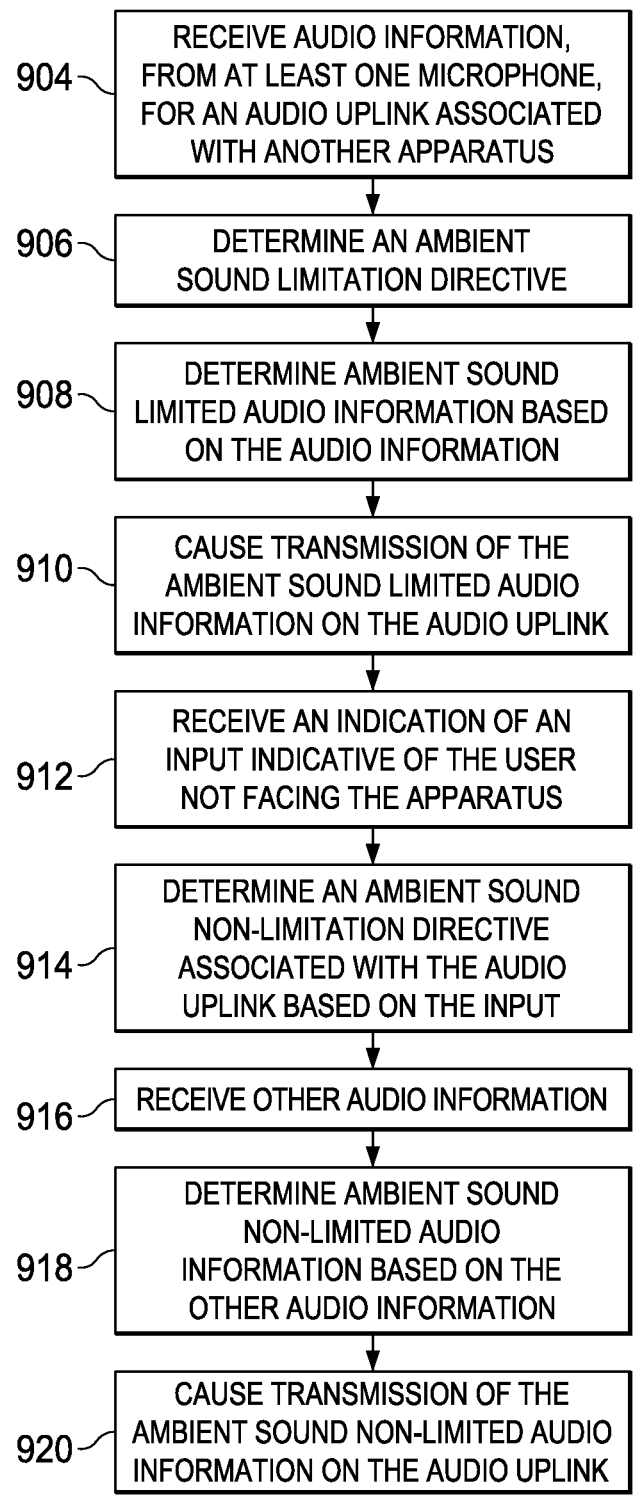
FIG. 9 is a flow diagram illustrating determination of ambient sound processed audio information according to at least one example embodiment.

FIG. 9 is a flow diagram illustrating determination of ambient sound processed audio information according to at least one example embodiment. In at least one example embodiment, there is a set of operations that corresponds the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9. Even though the example of FIG. 9 illustrates a change from an ambient sound limitation directive to an ambient sound non-limitation directive, any combination or permutation of transitions may be possible.

At block 904, the apparatus receives audio information, from at least one microphone, for an audio uplink associated with another apparatus, similarly as described regarding block 504 of FIG. 5. At block 906, the apparatus determines an ambient sound limitation directive associated with the audio uplink, similarly as described regarding block 806 of FIG. 8. At block 908, the apparatus determines ambient sound limited audio information in conformance with the ambient sound limitation directive based, at least in part, on the audio information, similarly as described regarding block 808 of FIG. 8. At block 910, the apparatus causes transmission of the ambient sound limited audio information by way of the audio uplink, similarly as described regarding block 810 of FIG. 8.

At block 912, the apparatus receives an indication of an input indicative of the user not facing the apparatus. The receipt, the indication, and the input may be similar as described regarding FIGS. 3A-3C and FIG. 11.

At block 914, the apparatus determines an ambient sound non-limitation directive associated with the audio uplink based, at least in part, on the input. The determination and the ambient sound non-limitation directive may be similar as described regarding FIGS. 3A-3C, and FIG. 11.

At block 916, the apparatus receives other audio information, from at least one microphone, for the audio uplink, similarly as described regarding block 816 of FIG. 8. At block 918, the apparatus determines ambient sound non-limited audio information in conformance with the ambient sound non-limitation directive based, at least in part, on the audio information, similarly as described regarding block 818 of FIG. 8. At block 920, the apparatus causes transmission of the ambient sound non-limited audio information by way of the audio uplink, similarly as described regarding block 820 of FIG. 8.

Figure 10:
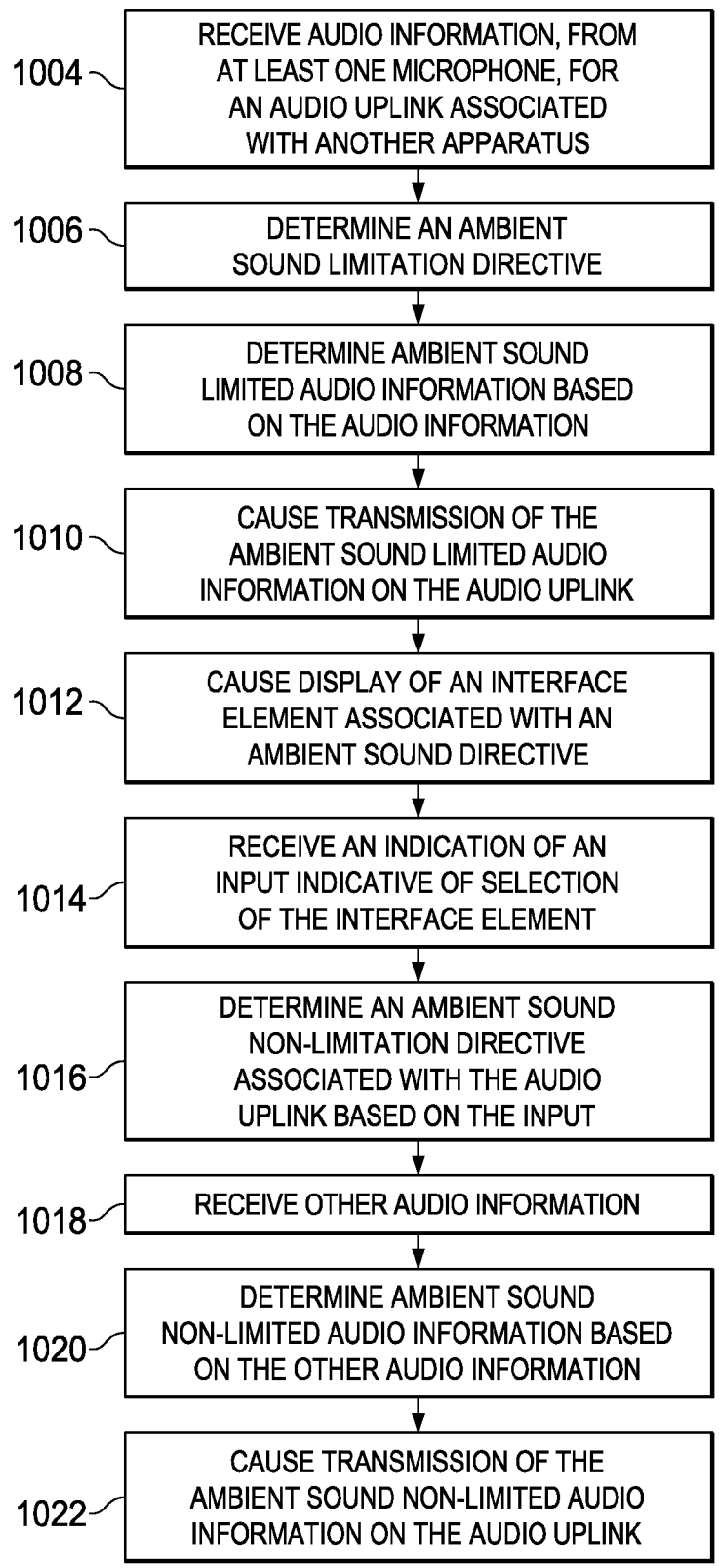
FIG. 10 is a flow diagram illustrating determination of ambient sound processed audio information according to at least one example embodiment.

FIG. 10 is a flow diagram illustrating determination of ambient sound processed audio information according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10. Even though the example of FIG. 10 illustrates a change from an ambient sound limitation directive to an ambient sound non-limitation directive, any combination or permutation of transitions may be possible.

At block 1004, the apparatus receives audio information, from at least one microphone, for an audio uplink associated with another apparatus, similarly as described regarding block 504 of FIG. 5. At block 1006, the apparatus determines an ambient sound limitation directive associated with the audio uplink, similarly as described regarding block 806 of FIG. 8. At block 1008, the apparatus determines ambient sound limited audio information in conformance with the ambient sound limitation directive based, at least in part, on the audio information, similarly as described regarding block 808 of FIG. 8. At block 1010, the apparatus causes transmission of the ambient sound limited audio information by way of the audio uplink, similarly as described regarding block 810 of FIG. 8.

At block 1012, the apparatus causes display of an interface element associated with the ambient sound directive, similarly as described regarding block 706 of FIG. 7. At block 1014, the apparatus receives an indication of an input indicative of selection of the interface element, similarly as described regarding block 708 of FIG. 7.

At block 1016, the apparatus determines an ambient sound non-limitation directive associated with the audio uplink based, at least in part, on the input The determination and the ambient sound non-limitation directive may be similar as described regarding FIGS. 3A-3C and FIG. 11.

At block 1018, the apparatus receives other audio information, from at least one microphone, for the audio uplink, similarly as described regarding block 816 of FIG. 8. At block 1020, the apparatus determines ambient sound non-limited audio information in conformance with the ambient sound non-limitation directive based, at least in part, on the audio information, similarly as described regarding block 818 of FIG. 8. At block 1022, the apparatus causes transmission of the ambient sound non-limited audio information by way of the audio uplink, similarly as described regarding block 820 of FIG. 8.

Figure 11:
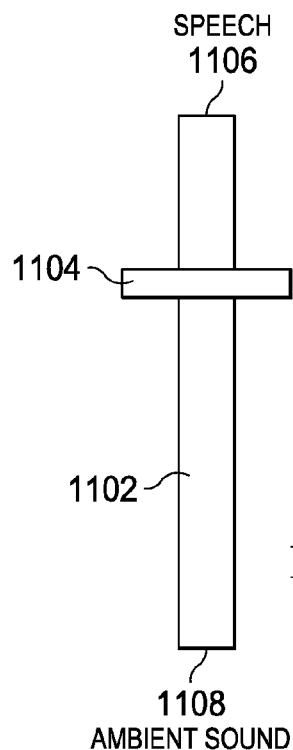
FIG. 11 is a diagram illustrating an interface element associated with an ambient sound directive according to at least one example embodiment.

FIG. 11 is a diagram illustrating an interface element associated with an ambient sound directive according to at least one example embodiment. The example of FIG. 11 is merely an example of an interface element associated with an ambient sound directive, and does not limit the scope of the claims. For example, representation of the interface element may vary, orientation of the interface element may vary, position of, at least part of, the interface element may vary, and/or the like.

In some circumstances, it may be desirable to control an amount of speech audio information and/or ambient audio information that is provided by way of an audio uplink. For example, it may be desirable for an apparatus to provide a certain magnitude of ambient sound information under some circumstances, and to provide a different magnitude of ambient sound information under different circumstances. In some circumstances, it may be desirable for an apparatus to allow a user to influence an amount of speech audio information and/or ambient audio information that is provided by way of an audio uplink. For example, a user at a party may desire to provide a high magnitude of ambient sound when desiring to share the party experience by way of the audio uplink, and may desire to provide a low magnitude of ambient sound when desiring to merely allow the audio uplink to indicate presence at the party.

In at least one example embodiment, the ambient sound directive relates to a directive that specifies a magnitude of ambient audio information. In at least one example embodiment, the magnitude of audio information relates to a level of intensity of audio that is conveyed by the audio information. For example, a higher magnitude audio information may indicate louder audio than indicated by a lower magnitude audio information. The magnitude of ambient audio information may relate to scaling factor that indicates the magnitude as a proportion of ambient sound processed audio to allocate to the ambient audio information. For example, the scaling factor may relate to a percentage, a factor, a multiplier, and/or the like. In at least one example embodiment, the ambient sound directive relates to a directive that specifies a magnitude of speech audio information. The magnitude of ambient audio information may relate to scaling factor that indicates the magnitude as a proportion of ambient sound processed audio to allocate to the ambient audio information.

The scaling factor may be in relation to received audio, in relation to determined ambient sound processed audio information, and/or the like. For example, the scaling factor may indicate a scaling factor to be applied to received audio information when determining ambient sound processed audio information. In another example, the scaling factor may indicate a scaling factor that represents an amount of a particular type of audio information, such as speech audio information, ambient audio information, etc., of which the ambient sound processed audio information comprises. In such an example the scaling factor may indicate that ambient sound processed audio information comprises a certain percentage of ambient audio information.

In at least one example embodiment, the magnitude of speech audio information relates to scaling factor that indicates the magnitude as a proportion of ambient sound processed audio to allocate to the speech audio information. For example, the ambient sound directive may indicate a particular composition of ambient audio information in relation to speech audio information. In such an example, the ambient sound directive may comprise a ration that indicates a magnitude relationship between ambient audio information and speech audio information. In at least one example embodiment, the magnitude of ambient audio information in relation to speech audio information relates to a scaling factor that indicates the magnitude as a proportion of ambient sound processed audio to allocate to the speech audio information and ambient sound information. In such an example, the ambient sound directive may direct that the ambient sound processed audio information comprise a percentage of ambient sound information such that the remaining percentage of audio information comprised by the ambient sound processed audio information is speech audio information. In this manner, the ambient sound directive may relate to a directive that specifies a magnitude of ambient audio information in relation to speech audio information, that specifies a magnitude of speech audio information in relation to ambient audio information, and/or the like.

In at least one example embodiment, determination of ambient sound processed audio information in conformance with the ambient sound directive that specifies the magnitude comprises determination of the ambient sound processed audio information in conformance with the magnitude. In at least one example embodiment, determination of the ambient sound processed audio information in conformance with the magnitude relates to determination of the ambient sound processed audio information such that the ambient sound processed audio information comprises ambient sound information in proportion to the magnitude, speech sound information in proportion to the magnitude, and/or the like.

In at least one example embodiment, an ambient sound limitation directive relates to an ambient sound directive that specifies a magnitude of ambient sound information indicative of a reduction of ambient sound information. For example, if an ambient sound directive indicates that the apparatus reduces the magnitude of ambient sound audio information when determining the ambient sound processed audio information, the ambient sound directive may relate to an ambient sound limitation directive. In at least one example embodiment, an ambient sound non-limitation directive relates to an ambient sound directive that specifies a magnitude of ambient sound information non-indicative of a reduction of ambient sound information. In at least one example embodiment, the magnitude of ambient sound information non-indicative of a reduction of ambient sound information relates to a magnitude of ambient sound information that corresponds with a received ambient sound information, a magnitude of ambient sound information that corresponds with an increase of ambient sound information, and or the like. For example, if an ambient sound directive indicates that the apparatus avoids reduction of the magnitude of ambient sound audio information when determining the ambient sound processed audio information, the ambient sound directive may relate to an ambient sound non-limitation directive. In another example, if an ambient sound directive indicates that the apparatus increases the magnitude of ambient sound audio information when determining the ambient sound processed audio information, the ambient sound directive may relate to an ambient sound non-limitation directive.

In some circumstances, if may be desirable to provide a simple and intuitive manner in which a user may vary magnitude of ambient audio information, magnitude of speech audio information, and/or the like, which is provided by ambient sound processed audio information. In at least one example embodiment, the apparatus provides a slider interface element that allows a user to set and/or modify an ambient sound directive. In at least one example embodiment, the apparatus may cause display of a slider interface element associated with the ambient sound directive. In such an example, the apparatus may receive an indication of an input indicative of the magnitude. For example, the input indicative of the magnitude may relate to an input indicative of a position on the slider interface element. In such an example, the position may be indicative of the magnitude.

In at least one example embodiment, the slider interface element comprises a slider endpoint associated with speech audio information and a slider endpoint associated with ambient audio information. In such an example, in circumstances where the magnitude of ambient audio information in relation to speech audio information may relate to a scaling factor that indicates the magnitude as a proportion of ambient sound processed audio to allocate to the speech audio information and ambient sound information, such that the position on the slider interface element indicates the proportion. For example, the position on the slider interface element may indicate the proportion such that the proportion relates to a factor indicative of a distance from the position to at least one slider endpoint.

In the example of FIG. 11, slider interface element 1102 comprises slider selection point 1104 at a position on slider interface element 1102. In at least one example embodiment, slider interface element relates to an ambient sound directive. In the example of FIG. 11, slider endpoint 1106 relates to speech audio information and slider endpoint 1108 relates to ambient audio information. In this manner, a position on slider interface element 1102 that is closer to slider endpoint 1006 than to slider endpoint 1108 may be indicative of a ambient sound directive indicative of a higher magnitude of speech audio information than indicated by a position of slider interface element 1102 that is closer to slider endpoint 1108 than to slider endpoint 1106. Similarly, a position on slider interface element 1102 that is closer to slider endpoint 1008 than to slider endpoint 1106 may be indicative of a ambient sound directive indicative of a higher magnitude of ambient audio information than indicated by a position of slider interface element 1102 that is closer to slider endpoint 1106 than to slider endpoint 1108.

Figure 12:
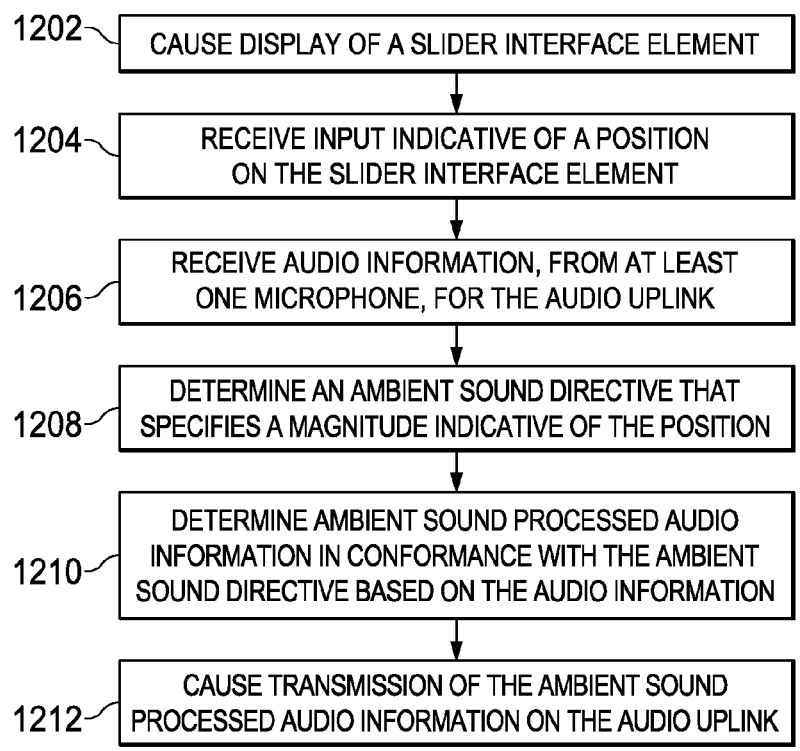
FIG. 12 is a flow diagram illustrating determination of ambient sound processed audio information according to at least one example embodiment.

FIG. 12 is a flow diagram illustrating determination of ambient sound processed audio information according to at least one example embodiment. In at least one example embodiment, there is a set of operations that corresponds the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus causes display of a slider interface element associated with an ambient sound directive. The slider interface element may be similar as described regarding FIG. 11.

At block 1204, the apparatus receives an indication of an input indicative of a position on the slider interface element. The receipt and the input may be similar as described regarding FIGS. 3A-3C, FIGS. 4A-4C, and FIG. 11.

At block 1206, the apparatus receives audio information, from at least one microphone, for an audio uplink associated with another apparatus, similarly as described regarding block 504 of FIG. 5.

At block 1208, the apparatus determines an ambient sound directive associated with the audio uplink, such that the ambient sound directive specifies a magnitude indicative of the position. The determination, the magnitude, and the ambient sound directive may be similar as described regarding FIGS. 3A-3C, FIGS. 4A-4C, and FIG. 11.

At block 1210, the apparatus determines ambient sound processed audio information in conformance with the ambient sound directive based, at least in part, on the audio information, similarly as described regarding block 508 of FIG. 5. At block 1212, the apparatus causes transmission of the ambient sound processed audio information by way of the audio uplink, similarly as described regarding block 510 of FIG. 5.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 704 of FIG. 7 may be performed after block 706. Furthermore, if desired, one or more of the above-described functions may be optional or may be combined. For example, blocks 606 and 608 of FIG. 6 may be optional and/or combined with block 506 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   receive audio information, from at least one microphone, for an audio uplink associated with another apparatus;
   receive an indication of an input indicative of a user facing the apparatus;
   in response to the input indicative of the user facing the apparatus, determine first ambient sound limited audio information based, at least in part, on the audio information, such that the first ambient sound limited audio information comprises a first magnitude of ambient audio information;
   cause transmission of the ambient sound limited audio information by way of the audio uplink;
   receive other audio information from the at least one microphone;
   receive an indication of an input indicative of the user not facing the apparatus; and
   in response to the input indicative of the user not facing the apparatus, determine second ambient sound limited audio information based, at least in part, on the audio information, such that the second ambient sound limited audio information comprises a second magnitude of ambient audio information that is greater than the first magnitude of the ambient audio information.

2. The apparatus of claim 1, wherein determination of the first ambient sound limited audio information comprises utilization of one or more ambient sound reduction techniques.

3. The apparatus of claim 1, wherein at least one of the first ambient sound limited audio information or the second ambient sound limited audio information is determined based, at least in part, on an ambient sound directive that specifies a magnitude of ambient audio information.

4. The apparatus of claim 2, wherein the audio information is received from a plurality of microphones, and the ambient sound reduction technique comprises determination of directional audio information.

5. The apparatus of claim 4, wherein the audio information comprises audio information received from at least one speech microphone and audio information received from at least one ambient microphone, and the determination of the first ambient sound limited audio information comprises cancelling at least part of the audio information received from the speech microphone based, at least in part, on the audio information received from the ambient microphone.

6. The apparatus of claim 1, wherein the memory further comprises computer program code that causes the apparatus to perform:
receive other audio information;
receive an indication of an input indicative of the apparatus being proximate to a user's ear;
in response to the input indicative of the apparatus being proximate to the user's ear, determine third ambient sound limited audio information based, at least in part, on the other audio information, such that the third ambient sound limited audio information comprises a third magnitude of ambient audio information that is lesser than the second magnitude of the ambient audio information; and
cause transmission of the third ambient sound limited audio information by way of the audio uplink.

7. The apparatus of claim 1, wherein the memory further comprises computer program code that causes the apparatus to perform:
receive other audio information;
cause display of an interface element associated with ambient sound;
receive an indication of an input indicative of selection of the interface element;
in response to the input indicative of the selection of the interface element, determine third ambient sound limited audio information based, at least in part, on the other audio information, such that the third ambient sound limited audio information comprises a third magnitude of ambient audio information that is lesser than the second magnitude of the ambient audio information; and
cause transmission of the third ambient sound limited audio information by way of the audio uplink.

8. The apparatus of claim 1, wherein the apparatus comprises the microphone.

9. A method comprising:
receiving, by an apparatus, audio information, from at least one microphone, for an audio uplink associated with another apparatus;
receiving, by the apparatus, an indication of an input indicative of a user facing the apparatus;
in response to the input indicative of the user facing the apparatus, determining, by the apparatus, first ambient sound limited audio information based, at least in part, on the audio information, such that the first ambient sound limited audio information comprises a first magnitude of ambient audio information; and
causing, by the apparatus, transmission of the ambient sound limited audio information by way of the audio uplink;
receiving, by the apparatus, other audio information from the at least one microphone;
receiving, by the apparatus, an indication of an input indicative of the user not facing the apparatus; and
in response to the input indicative of the user not facing the apparatus, determining, by the apparatus, second ambient sound limited audio information based, at least in part, on the audio information, such that the second ambient sound limited audio information comprises a second magnitude of ambient audio information that is greater than the first magnitude of the ambient audio information.

10. The method of claim 9, wherein determining the first ambient sound limited audio information comprises utilization of one or more ambient sound reduction techniques.

11. The method of claim 10, wherein the audio information is received from a plurality of microphones, and the ambient sound reduction technique comprises determination of directional audio information.

12. The method of claim 11, wherein the audio information comprises audio information received from at least one speech microphone and audio information received from at least one ambient microphone, and the determination of the first ambient sound limited audio information comprises cancelling at least part of the audio information received from the speech microphone based, at least in part, on the audio information received from the ambient microphone.

13. The method of claim 9, wherein at least one of the first ambient sound limited audio information or the second ambient sound limited audio information is determined based, at least in part, on an ambient sound directive that specifies a magnitude of ambient audio information.

14. The method of claim 9, further comprising:
receiving, by the apparatus, other audio information;
receiving, by the apparatus, an indication of an input indicative of the apparatus being proximate to a user's ear;
in response to the input indicative of the apparatus being proximate to the user's ear, determining, by the apparatus, third ambient sound limited audio information based, at least in part, on the other audio information, such that the third ambient sound limited audio information comprises a third magnitude of ambient audio information that is lesser than the second magnitude of the ambient audio information; and
causing, by the apparatus, transmission of the third ambient sound limited audio information by way of the audio uplink.

15. The method of claim 9, further comprising:
receiving other audio information;
causing display of an interface element associated with ambient sound;
receiving an indication of an input indicative of selection of the interface element;
in response to the input indicative of the selection of the interface element, determining third ambient sound limited audio information based, at least in part, on the other audio information, such that the third ambient sound limited audio information comprises a third magnitude of ambient audio information that is lesser than the second magnitude of the ambient audio information; and
causing transmission of the third ambient sound limited audio information by way of the audio uplink.

16. At least one non-transitory computer-readable medium encoded with instructions that, when executed by a processor, perform:
receiving audio information, from at least one microphone, for an audio uplink associated with another apparatus;

receiving an indication of an input indicative of a user facing the apparatus;

in response to the input indicative of the user facing the apparatus, determining first ambient sound limited audio information based, at least in part, on the audio information, such that the first ambient sound limited audio information comprises a first magnitude of ambient audio information; and causing transmission of the ambient sound limited audio information by way of the audio uplink;

receiving other audio information from the at least one microphone;

receiving an indication of an input indicative of the user not facing the apparatus; and in response to the input indicative of the user not facing the apparatus, determining second ambient sound limited audio information based, at least in part, on the audio information, such that the second ambient sound limited audio information comprises a second magnitude of ambient audio information that is greater than the first magnitude of the ambient audio information.

17. The medium of claim 16, wherein determining the first ambient sound limited audio information comprises utilization of one or more ambient sound reduction techniques.

18. The medium of claim 17, wherein the audio information is received from a plurality of microphones, and the ambient sound reduction technique comprises determination of directional audio information.

19. The medium of claim 18, wherein the audio information comprises audio information received from at least one speech microphone and audio information received from at least one ambient microphone, and the determination of the first ambient sound limited audio information comprises cancelling at least part of the audio information received from the speech microphone based, at least in part, on the audio information received from the ambient microphone.

20. The medium of claim 16, wherein the instructions that, when executed by a processor, further perform:

receiving other audio information;

receiving an indication of an input indicative of the apparatus being proximate to a user's ear;

in response to the input indicative of the apparatus being proximate to the user's ear, determining third ambient sound limited audio information based, at least in part, on the other audio information, such that the third ambient sound limited audio information comprises a third magnitude of ambient audio information that is lesser than the second magnitude of the ambient audio information; and causing transmission of the third ambient sound limited audio information by way of the audio uplink.

\* \* \* \* \*